(12) United States Patent
Lin

(10) Patent No.: US 8,823,261 B2
(45) Date of Patent: Sep. 2, 2014

(54) LIGHTING APPARATUS, BACKLIGHT MODULE AND DISPLAY APPARATUS

(75) Inventor: Tseng-Hung Lin, Chu-Nan (TW)

(73) Assignee: Innolux Corporation, Jhu-Nan (TW)

( * ) Notice: Subject to any disclaimer, the term of this patent is extended or adjusted under 35 U.S.C. 154(b) by 232 days.

(21) Appl. No.: 13/542,580

(22) Filed: Jul. 5, 2012

(65) Prior Publication Data
US 2013/0010493 A1  Jan. 10, 2013

(30) Foreign Application Priority Data
Jul. 7, 2011 (TW) .............................. 100124120 A

(51) Int. Cl.
*F21V 7/04* (2006.01)
(52) U.S. Cl.
USPC .......................................... 313/613; 362/611
(58) Field of Classification Search
CPC ................. G02B 6/0068; G02F 1/133615
USPC ................. 362/606, 613, 615, 632
See application file for complete search history.

(56) References Cited

FOREIGN PATENT DOCUMENTS

| CN | 1932619 | 3/2007 |
|---|---|---|
| CN | 101446711 | 6/2009 |

*Primary Examiner* — Vip Patel
(74) *Attorney, Agent, or Firm* — Liu & Liu

(57) ABSTRACT

A lighting apparatus includes a light-guiding plate and a lighting unit. The light-guiding plate includes a light-incident surface and a light-emitting surface. The lighting unit includes a first light source, a second light source and a circuit board. The first and second light sources are disposed on the circuit board, and the light emitted by the first and second light sources enters into the light-guiding plate through the light-incident surface and exits the light-guiding plate through the light-emitting surface. A first distance from the first light source to a reference line of the light-incident surface is not equal to a second distance from the second light source to the reference line.

13 Claims, 7 Drawing Sheets

LIGHTING APPARATUS, BACKLIGHT MODULE AND DISPLAY APPARATUS

CROSS REFERENCE TO RELATED APPLICATIONS

This Non-provisional application claims priority under 35 U.S.C. §119(a) on Patent Application No(s). 100124120 filed in Taiwan, Republic of China on Jul. 7, 2011, the entire contents of which are hereby incorporated by reference.

BACKGROUND

1. Field of Invention

The present invention relates to a lighting apparatus, a backlight module and a display apparatus. In particular, the present invention relates to a lighting apparatus, a backlight module and a display apparatus with light-emitting diodes.

2. Related Art

Since the commercialization of light emitting diode (LED), it is widely applied in various products in everyday life such as home appliances as well as indicator lights and light sources of various apparatuses because of its characteristics of long life expectancy, low power consumption and low temperature generated. In the recent years, LED is also applied in backlight modules of flat panel display devices.

As flat panel display devices are getting lighter, slimmer and more compact, light emitting diodes (LEDs) are applied in backlight modules of flat panel display devices to replace conventional fluorescent lamps, thus a thickness can be reduced. FIG. 1 is an illustration of conventional light emitting diodes applied in a backlight module. As shown in FIG. 1, the backlight module 1 comprises a light-guiding plate 11 and a plurality of light emitting diodes (LEDs) 12. The LEDs 12 are arranged in a row and are disposed adjacent to a light-incident surface 111 of the light-guiding plate 11, so that a light emitted by the LEDs 12 enters into the light-guiding plate 11 through the light-incident surface 111.

In order to enhance a brightness of the backlight module 1, high power LEDS are required. However, the high power LEDs have larger dimensions, so that a thickness of the light-guiding plate needs to be increased. Therefore, the light emitted by the high power LEDS can enter into the light-guiding plate. Unfortunately, such a requirement is not favorable for the demands of lightness and slimness of products.

Therefore, it is an important subject of the present invention to provide a lighting apparatus, a backlight module and a display apparatus which can still be slim while a brightness of emitted light can be enhanced in order to maintain the competitiveness in the markets.

SUMMARY

In view of the foregoing, an object of the present invention is to provide a lighting apparatus, a backlight module and a display apparatus which can still be slim while a brightness of emitted light can be enhanced in order to maintain the competitiveness in the markets.

To achieve the above object, the present invention discloses a lighting apparatus including a light-guiding plate and a lighting unit. The light-guiding plate includes a light-incident surface and a light-emitting surface. The lighting unit includes a first light source, a second light source and a circuit board. The first light source and the second light source are disposed on the circuit board, and light emitted by the first and second light sources enters into the light-guiding plate through the light-incident surface and exits the light-guiding plate through the light-emitting surface. A first distance from the first light source to a reference line of the light-incident surface is not equal to a second distance from the second light source to the reference line of the light-incident surface.

In addition, the present invention also discloses a backlight module including a light-guiding plate, at least one optical film, and a lighting unit. The light-guiding plate includes a light-incident surface and a light-emitting surface. The optical film is disposed adjacent to the light-emitting surface. The lighting unit includes a first light source, a second light source and a circuit board. The first light source and the second light source are disposed on the circuit board, and light emitted by the first and second light sources enters into the light-guiding plate through the light-incident surface and exits the light-guiding plate through the light-emitting surface. A first distance from the first light source to a reference line of the light-incident surface is not equal to a second distance from the second light source to the reference line of the light-incident surface.

Moreover, the present invention further discloses a display apparatus including a display panel and a backlight module. The backlight module is disposed adjacent to the display panel, and includes a light-guiding plate, at least one optical film, and a lighting unit. The light-guiding plate includes a light-incident surface and a light-emitting surface. The optical film is disposed adjacent to the light-emitting surface. The lighting unit includes a first light source, a second light source and a circuit board. The first light source and the second light source are disposed on the circuit board, and light emitted by the first and second light sources enters into the light-guiding plate through the light-incident surface and exits the light-guiding plate through the light-emitting surface. A first distance from the first light source to a reference line of the light-incident surface is not equal to a second distance from the second light source to the reference line of the light-incident surface.

As a conclusion from the abovementioned, the lighting apparatus, the backlight module and the display apparatus of the present invention employ side view lighting units, and the lighting units are disposed at different distances from a reference line. For examples, some of the light sources are arranged in a row at a first distance from the reference line, the other light sources are arranged in a row at a second distance from the reference line. Therefore, more numbers of the light sources can be arranged without increasing the thickness of the light-guiding plate, thereby enhancing the lighting brightness. Furthermore, because of the increased number of the light sources, the light sources with lower brightness can be used. Besides, because the light sources with lower brightness usually have thinner thicknesses, the thickness of the light-guiding plate is also reduced. As a result, the products can be made slimmer which is favorable for enhancing the competitiveness of the products substantially.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION

The present invention will be apparent from the following detailed description, which proceeds with reference to the accompanying drawings, wherein the same references relate to the same elements.

Figure 1:
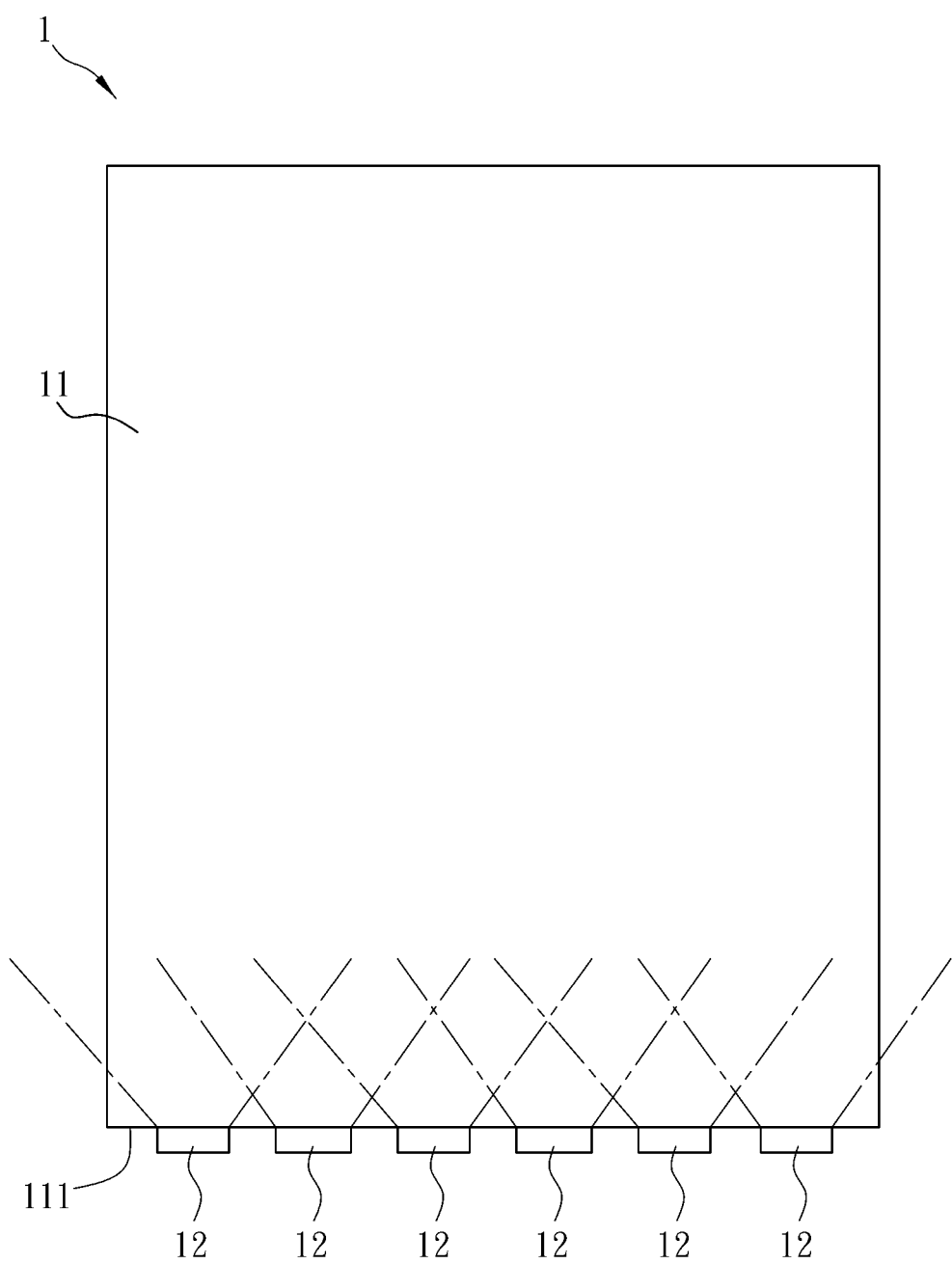
FIG. 1 is an illustration of conventional light emitting diodes applied in a backlight module.
Figure 2A:
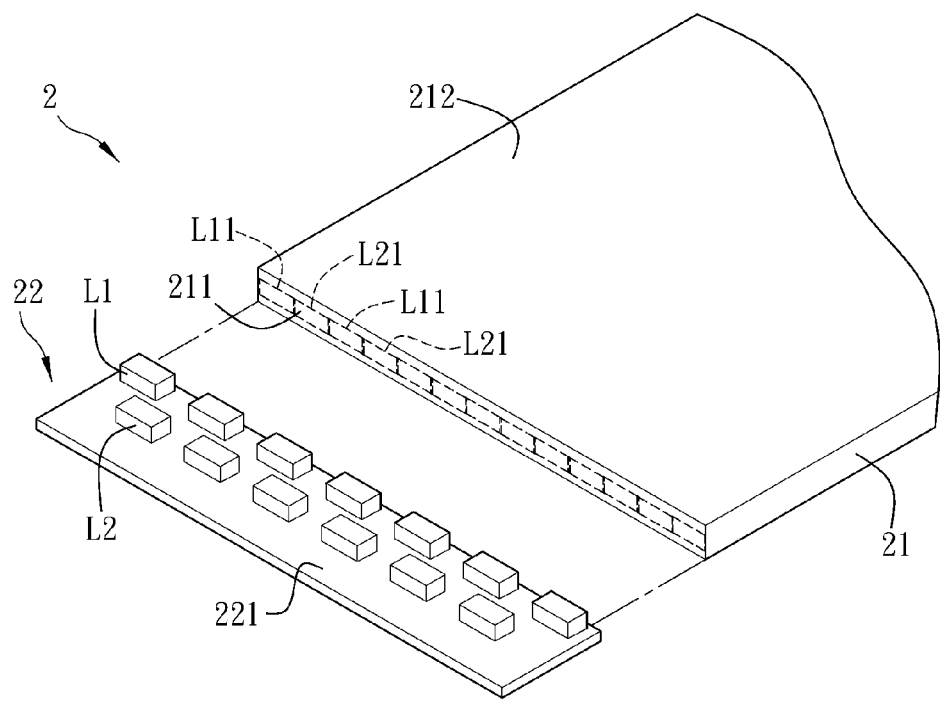
FIG. 2A is an exploded perspective view of a lighting apparatus according to a preferred embodiment of the present invention.
Figure 2B:
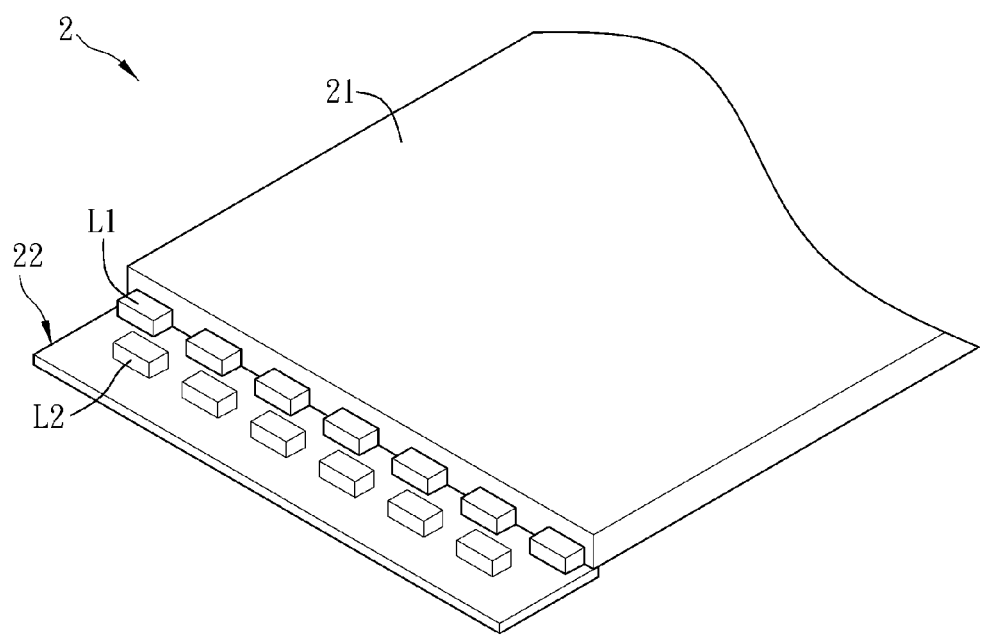
FIG. 2B is an assembled perspective view of the lighting apparatus in FIG. 2A.

FIG. 2A is an exploded perspective view of a lighting apparatus 2 according to a preferred embodiment of the present invention, and FIG. 2B is an assembled perspective view of the lighting apparatus 2 in FIG. 2A. Referring to FIGS. 2A and 2B, the lighting apparatus 2 comprises a light-guiding plate 21 and a lighting unit 22. In this embodiment, the lighting apparatus 2 can be an illumination device, a traffic signal light or an advertising board.

Figure 3:
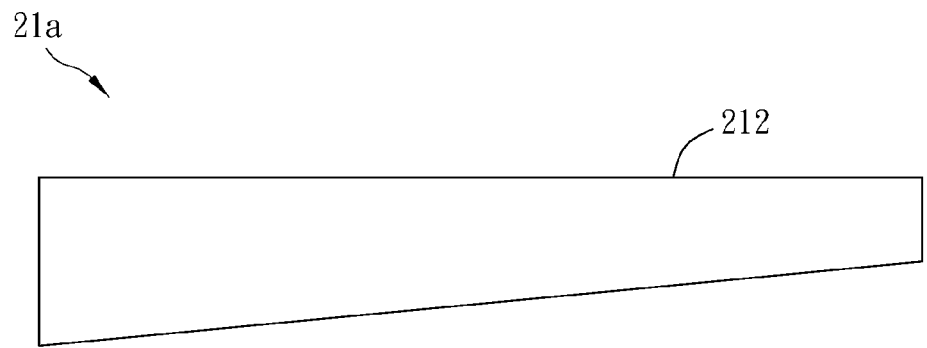
FIG. 3 is an illustration of a light-guiding plate as a wedged-shaped plate according to the present invention.

The material of the light-guiding plate 21 is, for example but not limited to, polymethylmethacrylate (PMMA), polycarbonate (PC) or other optical materials with high light transmittance. The light-guiding plate 21 has a light-incident surface 211 and a light-emitting surface 212 adjacent to the light-incident surface 211. The light-incident surface 211 of the light-guiding plate 21 can be scraggly, wavy, arc-shaped or flat, and the light-guiding plate 21 can be a flat plate or a wedge-shaped plate. In this embodiment, the light-incident surface 211 is flat, and the light-guiding plate is a flat plate. FIG. 3 shows a light-guiding plate 21a in a wedge-shape. Alternatively, in other embodiments, the light-emitting surface 212 of the light-guiding plate 21a can be in a staircase shape. It should be noted that, when a cross section of the light-guiding plate 21a is trapezoid, the light-guiding plate 21a is commonly called a wedge-shaped plate.

The lighting unit 22, which is disposed on a side of the light-incident surface 211 of the light-guiding plate 21, includes at least one first light source (first LED) L1, at least one second light source (second LED) L2 and a circuit board 221. In this embodiment, the first LED L1 and the second LED L2 are, for example but not limited to, side-view LEDs. The circuit board 221 can be a printed circuit board or a flexible circuit board. The first LED L1 and the second LED L2 are disposed on the circuit board 221 by the surface mounting process. A light emitted by the first LED L1 and the second LED L2 enters into the light-guiding plate 21 through the light-incident surface 211 and exits the light-guiding plate 21 through the light-emitting surface 212.

Figure 4:
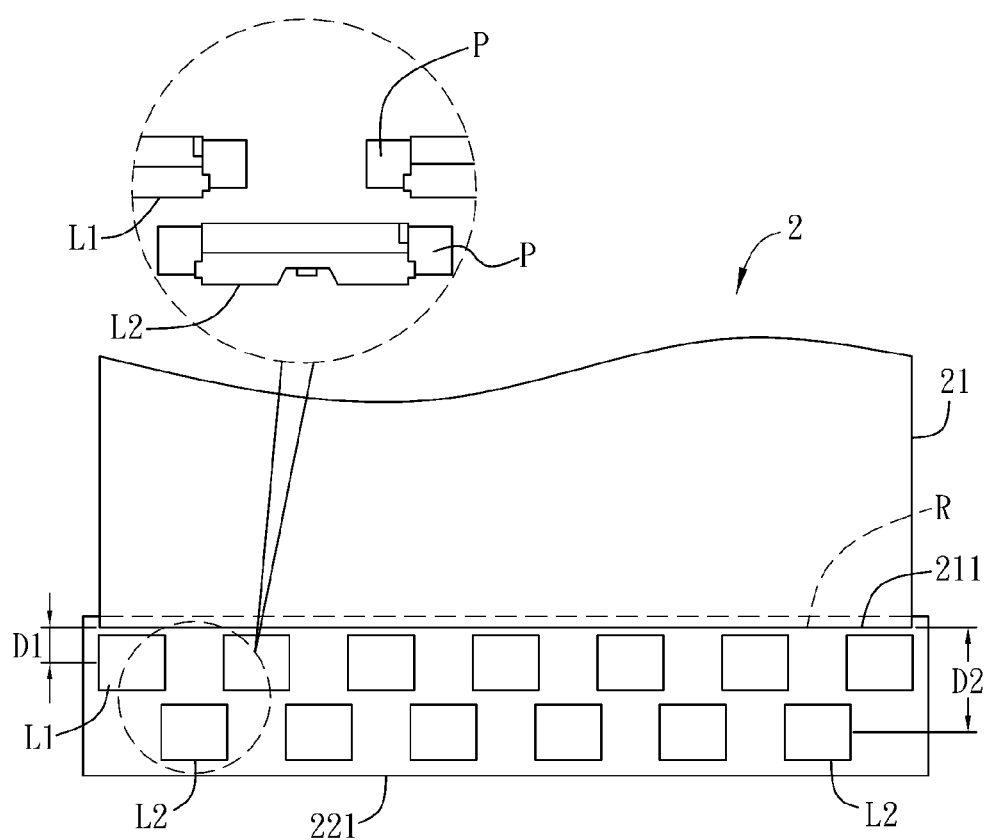
FIG. 4 is a top view of the lighting apparatus in FIG. 2B.

FIG. 4 is a top view of the lighting apparatus 2 in FIG. 2B. As shown in FIG. 4, two ends of the light-incident surface 211 of the light-guiding plate 21 are connected as a reference line R. A first distance D1 from the first light-emitting diode L1 to the reference line R of the light-incident surface 211 is not equal to a second distance D2 from the second light-emitting diode L2 to the reference line R of the light-incident surface 211. In this case, the first distance D1 is shorter than the second distance D2. When the light-incident surface 211 is a flat surface, the reference line R of the light-incident surface 211 is parallel to the light-incident surface 211, and is a long axis of the light-incident surface 211. Otherwise, the reference line R of the light-incident surface 211 is parallel to a long side of the circuit board 221. Herein, the first distance D1 is the shortest distance between the reference R and the center of the first LED L1, and the second distance D2 is the shortest distance between the reference R and the center of the second LED L2. Of course, the first distance D1 can also be defined as the shortest distance between the reference R and the light-emitting surface 212 of the first LED L1, and the second distance D2 can also be defined as the shortest distance between the reference R and the light-emitting surface 212 of the second LED L2.

In this embodiment, the lighting unit 22 includes a plurality of the first LEDs L1 and a plurality of the second LEDs L2 respectively. The first LEDs L1 and the second LEDs L2 are arranged in a straight line respectively, and the straight lines are parallel to the reference line R. Of course, the first LEDs L1 and the second LEDs L2 can also be arranged in more than three straight lines. Furthermore, vertical projections L11 and L21 of the first LEDs L1 and the second LEDs L2 on the light-incident surface 211 are disposed alternately as shown in FIG. 2A. The projections of the first LEDs L1 and the second LEDs L2 on the light-incident surface 211 are partially overlapped. In other words, when the first LEDs L1 and the second LEDs L2 are facing to the light-incident surface 211, their positions can be substantially disposed alternately, and they can also partially overlap with each other (as shown inside a dotted circle in FIG. 4. The overlapping parts include the lead portions P of the first LEDs L1 and the second LEDs L2, which are the non-lighting portions of the first LEDs L1 and the second LEDs L2. Accordingly, more numbers of the first LEDs L1 and the second LEDs L2 can be disposed on a same area of the light-incident surface 211 in this overlapping arrangement. For example, only light-emitting areas of the first LEDs L1 and the second LEDs L2 and none of the non-lighting portions are corresponded on the light-incident surface 211. Therefore, a space on the light-incident surface 211 for configuring the first LEDs L1 and the second LEDs L2 can be used more effectively, so that light-incident amount in unit area of the light-incident surface 211 are increased. If a brightness required by the light-guiding plate 21 is exceeded, the first LEDs L1 and the second LEDs L2 can be substituted by other LEDs with lower power. Because lower power LEDs are usually smaller in dimensions, the thickness of the light-guiding plate 21 can be reduced, thereby decreasing the thickness of the lighting apparatus 2.

A lighting apparatus of the present invention can have many aspects which will be described hereinbelow.

Figure 5A:
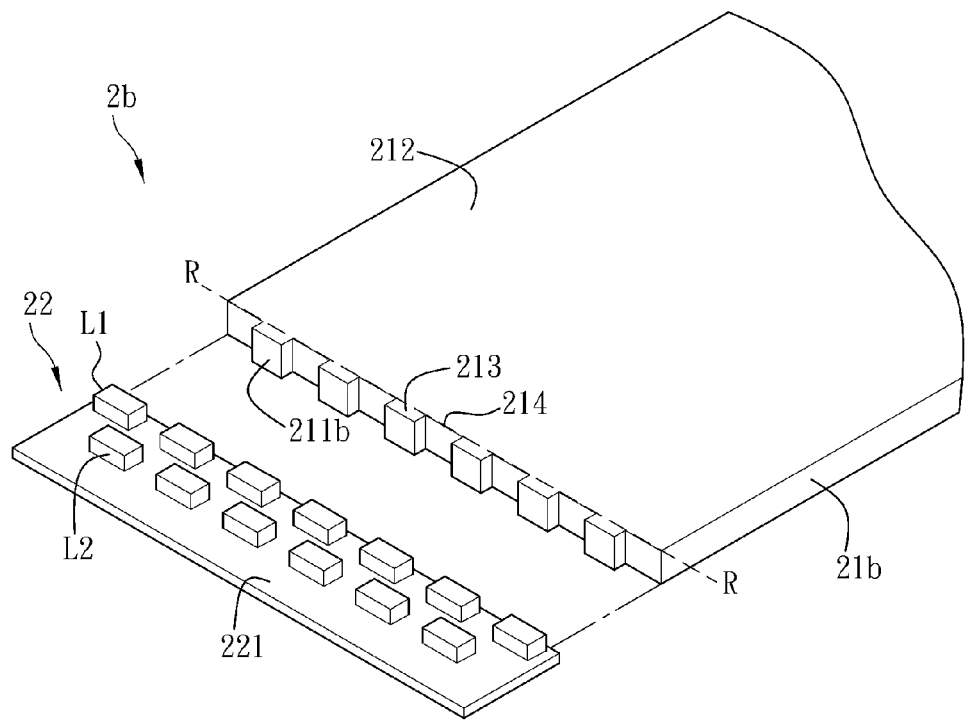
FIGS. 5A, 5B, 6A and 6B are illustrations showing various aspects of the lighting apparatus of the present invention.
Figure 5B:
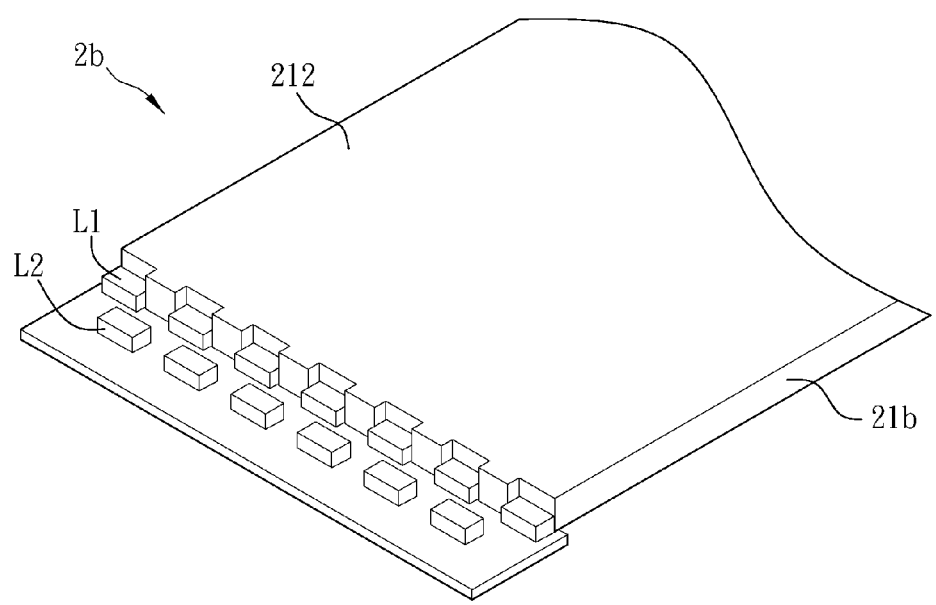

Referring to FIGS. 5A and 5B, a lighting apparatus 2b of another aspect comprises a light-guiding plate 21b and the lighting unit 22. In this aspect, the lighting unit 22 has been described above and therefore will not be mentioned herein again. Differences between the lighting apparatus 2b and lighting apparatus 2a lie in that, a light-incident surface 211b of the light-guiding plate 21b has a plurality of recessed portions 214 and a plurality of protruded portions 213, the first LEDs L1 are disposed in the recessed portions 214 respectively, and the second LEDs L2 are disposed corresponding to the protruded portions 213. Herein, a straight line passing bottoms of the recessed portions 214 is used as an example for the reference line R of the light-guiding plate 21b. In order to effectively utilize the space on the light-incident surface 211b for arranging the first LEDs L1 and the second LEDs L2, a width (including the leads) of each second LED L2 corresponding to the protruded portions 213 is wider than that of each protruded portion 213. More specifically, the width of each protruded portion 213 can be approximately the same as that of a lighting area of each second LED L2.

Figure 6A:
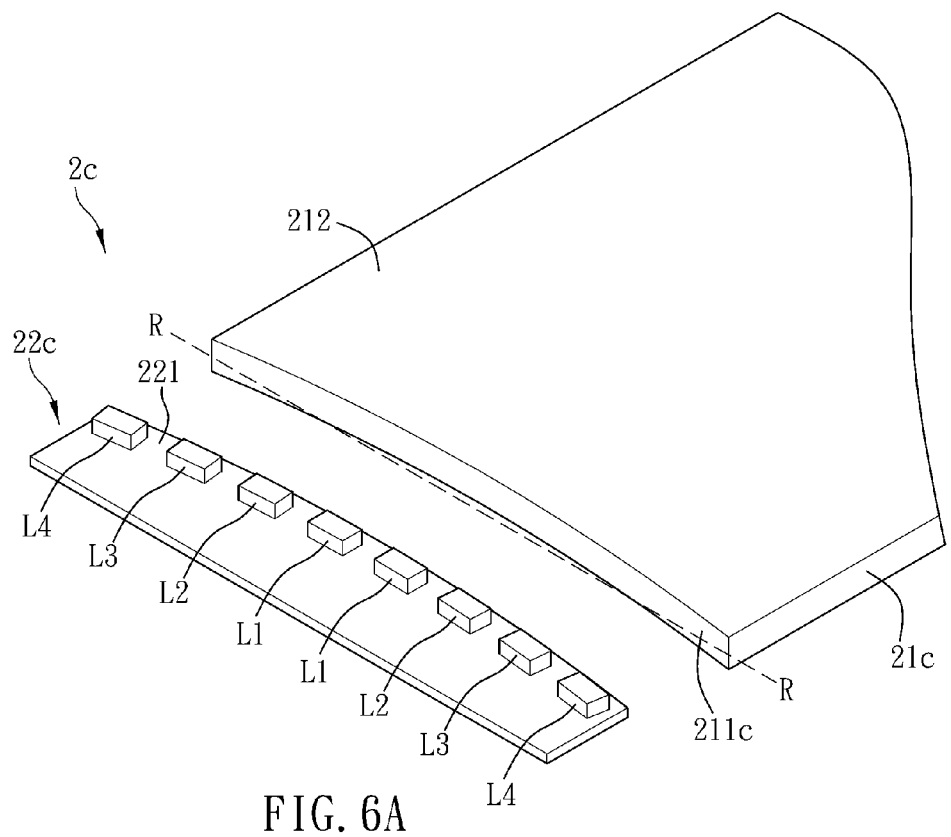
Figure 6B:
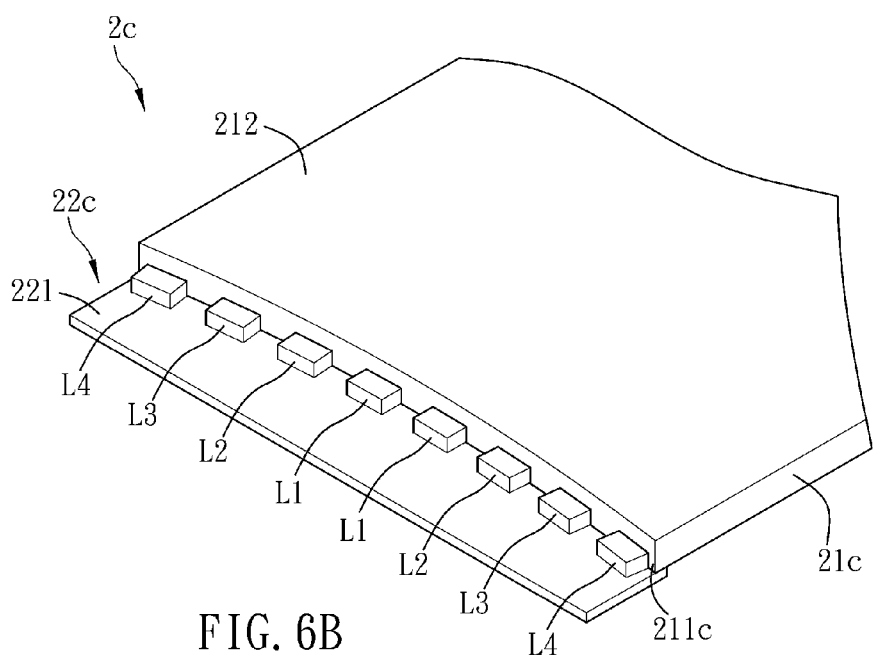

Referring to FIGS. 6A and 6B, a lighting apparatus 2c of another aspect comprises a light-guiding plate 21c and a lighting unit 22c. In this aspect, the light-incident surface 211c of the light-guiding plate 21c is in an arc-shape, and the lighting unit 22c can only include two first LEDs L1 and two second LEDs L2. In this case, the lighting unit 22c includes, for example but not limited to, two first LEDs L1, two second LEDs L2, two third LEDs L3 and two fourth LEDs L4. The LEDs L1 to L4 are disposed to match the arc-shaped light-incident surface 211c, so that the LEDs L1 to L4 are arranged in a curve such as an arc. Herein, a line passing through two ends of the arc-shaped light-incident surface 211c of the light-guiding plate 21c is used as an example for the reference line R of the light-guiding plate 21c. Relationships between shortest straight distances from the LEDs L1 to L4 to the reference line R are as follows: a first distance from the first LEDs L1 to the reference line R>a second distance from the second LEDs L2 to the reference line R>a third distance from the third light-emitting diodes L3 to the reference line R>a fourth distance from the fourth LEDs L4 to the reference line R. Of course, the LEDs L1 to L4 can be arranged in more than two curves.

Figure 7:
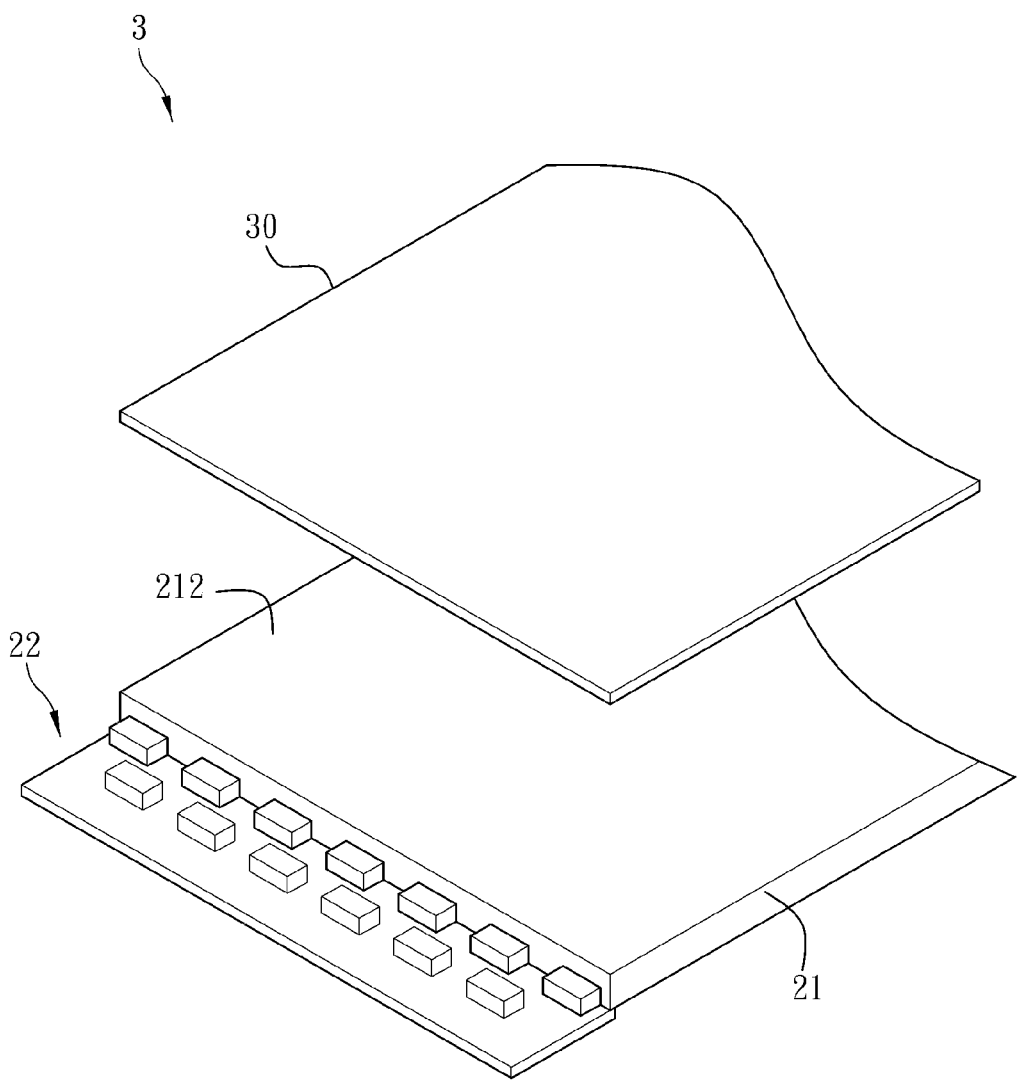
FIG. 7 is an illustration of a backlight module according to a preferred embodiment of the present invention.

FIG. 7 is an illustration of a backlight module 3 according to a preferred embodiment of the present invention. Referring to FIG. 7, the backlight module 3 comprises a light-guiding plate 21, a lighting unit 22 and at least one optical film 30. In applications, the backlight module 3 can be a backlight source applied in a flat panel display, or a lamp box for indicating, advertising or medical purposes. Herein, the backlight module 3 is a backlight module of a liquid crystal display. Of course, the backlight module 3 can comprise any of the abovementioned light-guiding plates and the side view lighting units of different modifications in the embodiments of the lighting apparatus, which will not be described herein again.

The optical film 30 is disposed adjacent to the light-emitting surface 212 of the light-guiding plate 21. Type and number of the optical film 30 of the present invention can be, for examples but not limited to, a prism, a diffusion film or a light enhancement film, etc, for modifying an optical characteristic of the light emitted from the light-guiding plate 21.

Figure 8:
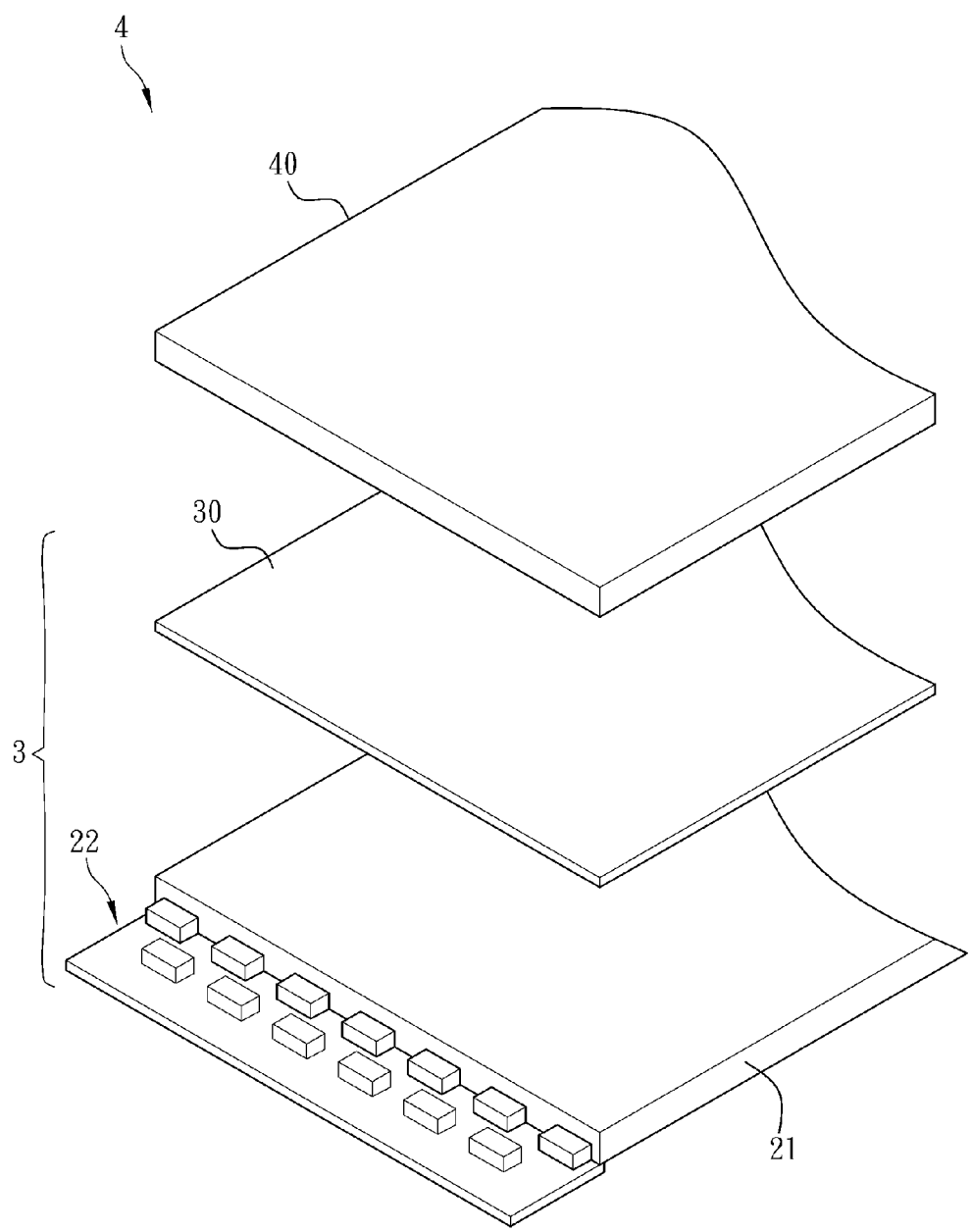
FIG. 8 is an illustration of a display apparatus according to a preferred embodiment of the present invention.

FIG. 8 is an illustration of a display apparatus 4 of a preferred embodiment of the present invention. Referring to FIG. 8, the display apparatus 4 comprises a display panel 40 and a backlight module 3. The backlight module 3 is disposed adjacent to the display panel 40 for providing a light source to the display panel 40. The display panel 40 is not a self-lighting panel, and it is a liquid crystal display panel for example. In this embodiment, the backlight module 3 can be the backlight module 3 mentioned above in view of FIG. 7, which will not be described herein again.

As a conclusion from the abovementioned, the lighting apparatus, the backlight module and the display apparatus of the present invention employ side view light-emitting diodes, and the light-emitting diodes are disposed on the circuit board at different distances from a reference line. For examples, some of the light-emitting diodes are arranged in a row at a first distance from the reference line, the other light-emitting diodes are arranged in a row at a second distance from the reference line. Therefore, more numbers of the light-emitting diodes can be arranged without increasing the thickness of the light-guiding plate, thereby enhancing the lighting brightness. Furthermore, because of the increased number of the light-emitting diodes, the light-emitting diodes with lower brightness can be used. Besides, because the light-emitting diodes with lower brightness usually have thinner thicknesses, the thickness of the light-guiding plate is also reduced. As a result, the products can be made slimmer which is favorable for enhancing the competitiveness of the products substantially.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A lighting apparatus, comprising:
   a light-guiding plate comprising a light-incident surface and a light-emitting surface disposed adjacent to the light-incident surface, wherein two ends of the light-incident surface are connected as a reference line; and
   a lighting unit disposed on a side of the light-incident surface, wherein the lighting unit comprises at least one first light source, at least one second light source and a circuit board, the first light source and the second light source are disposed on the circuit board, and light emitted by the first and second light sources enters into the light-guiding plate through the light-incident surface and exits the light-guiding plate through the light-emitting surface;
   wherein, a first distance from the first light source to the reference line of the light-incident surface is not equal to a second distance from the second light source to the reference line of the light-incident surface.

2. The lighting apparatus according to claim 1, wherein the light-incident surface of the light-guiding plate is scraggly, wavy, arc-shaped or flat.

3. The lighting apparatus according to claim 1, wherein the light unit comprises a plurality of first light sources and a plurality of second light sources, the first light sources and the second light sources are arranged in straight lines respectively, the straight lines are parallel to the reference line, and perpendicular projections of the first light sources and the second light sources on the light-incident surface are disposed alternately.

4. The lighting apparatus according to claim 3, wherein the light-incident surface of the light-guiding plate has a plurality of recessed portions and a plurality of protruded portions, the first light sources are disposed in the recessed portions, and the second light sources are disposed on the protruded portions.

5. The lighting apparatus according to claim 1, wherein the lighting unit comprises a plurality of first light sources and a plurality of second light sources, and the first light sources and the second light sources are arranged in a curve.

6. A backlight module, comprising:
   a light-guiding plate comprising a light-incident surface and a light-emitting surface disposed adjacent to the light-incident surface, wherein two ends of the light-incident surface are connected as a reference line;
   at least one optical film disposed adjacent to the light-emitting surface; and
   a lighting unit disposed on a side of the light-incident surface, wherein the lighting unit comprises at least one first light source, at least one second light source and a circuit board, the first light source and the second light source are disposed on the circuit board, and light emitted by the first and second light sources enters into the light-guiding plate through the light-incident surface and exits the light-guiding plate through the light-emitting surface;
   wherein, a first distance from the first light source to the reference line of the light-incident surface is not equal to a second distance from the second light source to the reference line of the light-incident surface.

7. The backlight module according to claim 6, wherein the light unit comprises a plurality of first light sources and a plurality of second light sources, the first light sources and the second light sources are arranged in straight lines respectively, the straight lines are parallel to the reference line, and perpendicular projections of the first light sources and the second light sources on the light-incident surface are disposed alternately.

8. The backlight module according to claim 7, wherein the light-incident surface of the light-guiding plate has a plurality of recessed portions and a plurality of protruded portions, the first light sources are disposed in the recessed portions, and the second light sources are disposed on the protruded portions.

9. The backlight module according to claim 6, wherein the lighting unit comprises a plurality of first light sources and a plurality of second light sources, and the first light sources and the second light sources are arranged in a curve.

10. A display apparatus, comprising:
a display panel; and
a backlight module disposed adjacent to the display panel, wherein the backlight module comprises:
a light-guiding plate comprising a light-incident surface and a light-emitting surface disposed adjacent to the light-incident surface, wherein two ends of the light-incident surface are connected as a reference line,
at least one optical film disposed adjacent to the light-emitting surface, and
a lighting unit disposed on a side of the light-incident surface, wherein the lighting unit comprises at least one first light source, at least one second light source and a circuit board, the first light source and the second light source are disposed on the circuit board, and light emitted by the first and second light sources enters into the light-guiding plate through the light-incident surface and exits the light-guiding plate through the light-emitting surface,
wherein, a first distance from the first light source to the reference line of the light-incident surface is not equal to a second distance from the second light source to the reference line of the light-incident surface.

11. The display apparatus according to claim 10, wherein the light unit comprises a plurality of first light sources and a plurality of second light sources, the first light sources and the second light sources are arranged in straight lines respectively, the straight lines are parallel to the reference line, and perpendicular projections of the first light sources and the second light sources on the light-incident surface are disposed alternately.

12. The display apparatus according to claim 11, wherein the light-incident surface of the light-guiding plate has a plurality of recessed portions and a plurality of protruded portions, the first light sources are disposed in the recessed portions, and the second light sources are disposed on the protruded portions.

13. The display apparatus according to claim 10, wherein the lighting unit comprises a plurality of first light sources and a plurality of second light sources, and the first light sources and the second light sources are arranged in a curve.

* * * * *

UNITED STATES PATENT AND TRADEMARK OFFICE
CERTIFICATE OF CORRECTION

PATENT NO. : 8,823,261 B2  
APPLICATION NO. : 13/542580  
DATED : September 2, 2014  
INVENTOR(S) : Tseng-Hung Lin It is certified that error appears in the above-identified patent and that said Letters Patent is hereby corrected as shown below:

In the title page, "(73) Assignee: Innolux Corporation, Jhu-Nan (TW)" should be changed to read:

-- (73) Assignee: Innocom Technology (Shenzhen) Co., Ltd., Shenzhen City (CN); Innolux Corporation, Jhu-Nan (TW) --

Signed and Sealed this  
Twenty-sixth Day of May, 2015

Michelle K. Lee  
*Director of the United States Patent and Trademark Office*